United States Patent [19]

Segre et al.

[11] 3,963,347
[45] June 15, 1976

[54] ERBIUM LASER CEILOMETER

[75] Inventors: Joseph Pipo Segre, Newton Center; Norman R. Truscott, Whitinsville, both of Mass.

[73] Assignee: American Optical Corporation, Southbridge, Mass.

[22] Filed: May 9, 1974

[21] Appl. No.: 468,342

[52] U.S. Cl. ........................ 356/5; 356/4; 350/1; 331/94.5 C; 331/94.5 D; 331/94.5 E; 331/94.5 P; 252/300
[51] Int. Cl.² ........................................ G01C 3/08
[58] Field of Search ............... 356/4, 5, 103; 350/1, 350/310; 331/94.5 C, 94.5 D, 94.5 E, 94.5 P; 117/35 R, 35 V; 252/300

[56] References Cited
UNITED STATES PATENTS

| | | | |
|---|---|---|---|
| 1,982,774 | 12/1934 | Winkler et al. | 117/35 V |
| 2,103,538 | 12/1937 | Kolb | 117/35 R |
| 3,146,120 | 8/1964 | Upton et al. | 350/1 |
| 3,339,150 | 8/1967 | Bowness | 331/94.5 F |
| 3,471,800 | 10/1969 | Congleton et al. | 331/94.5 D |
| 3,518,570 | 6/1970 | Dittrich | 331/94.5 P |
| 3,556,657 | 1/1971 | Quelle, Jr. | 350/1 |
| 3,781,552 | 12/1973 | Kadrmas | 356/103 |
| 3,782,824 | 1/1974 | Stoliar et al. | 356/103 |

OTHER PUBLICATIONS
NASA Tech Brief 68-10311, 8-1968.

Segre et al., 1973 IEEE/OSA Conf. on Laser Eng. & Appl., pp. 55–56, 5-1973.

*Primary Examiner*—Maynard R. Wilbur
*Assistant Examiner*—S. C. Buczinski
*Attorney, Agent, or Firm*—H. R. Berkenstock, Jr.; William C. Nealon

[57] ABSTRACT

A laser rangefinder for clouds, fog, haze and precipitation including an erbium doped laser transmitter, a germanium photodiode monitor and a germanium avalanche photodiode detector. The germanium avalanche photodiode and an amplifier module is positioned at the focus of a parabolic reflector. The transmitter transmits light in a waveband with an optical center at 1.54 microns and is eye safe. A periscope system aligns the outgoing pulse with the returning light to reduce parallax.

To reduce alignment problems when shifts in wavelengths occur, an optical circuit with only reflecting surfaces can be employed.

To increase the efficiency of the laser transmitter, the clamps utilized to position the laser rod within the cavity are formed of the same material as the laser rod and the pump light reflector is a second surface mirror with a quartz substrate coated in succession with silver, copper and black paint.

8 Claims, 12 Drawing Figures

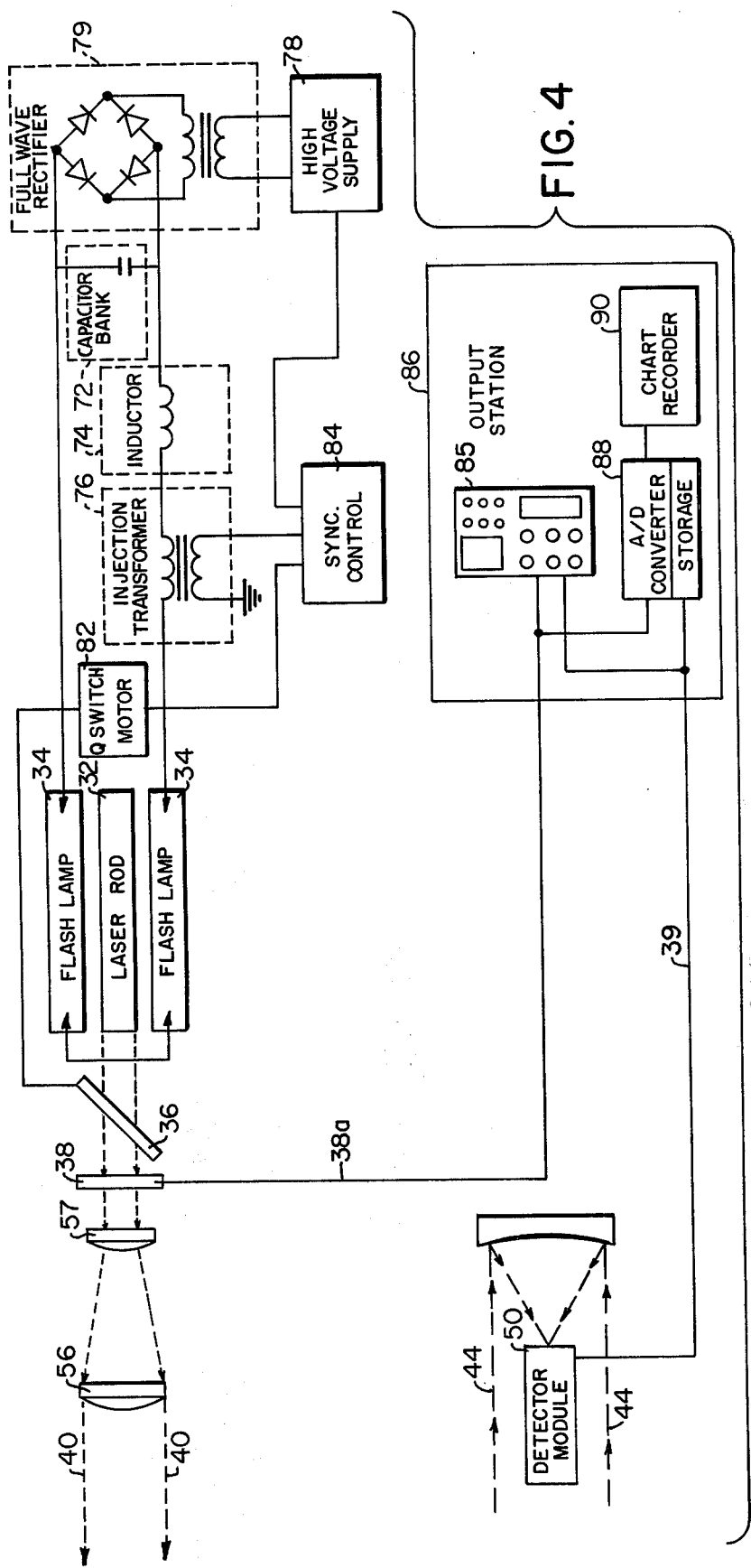
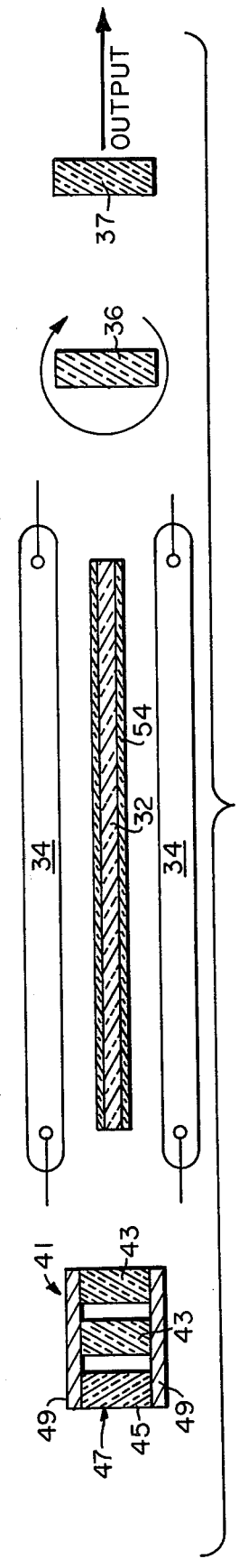
FIG. 4
FIG. 5

ERBIUM LASER CEILOMETER

BACKGROUND OF THE INVENTION

The field of the present invention is devices for measuring cloud heights. Such devices are commonly referred to as ceilometers. Devices for enabling fog determinations, related visibility measurements and cloud height determinations are desirable as an aid to navigation, particularly for directing air-borne traffic.

Previous devices for measuring cloud heights include the so-called rotating beam ceilometer which is shown schematically in FIG. 1 of the drawing. Rotating beam ceilometers operate on trigonometric calculations or triangulation. With rotating beam ceilometers, a fixed receiver 10 is positioned at a known distance from a light source 12 which is free to pivot through a known angular range. Light from the light source 12 (represented by arrows 11) scans the sky and when the scanning light strikes a cloud 14 that is over the receiver 10, the receiver 10 is able to detect the light striking the cloud. From a reading of the angle from which light from the light source 12 struck the cloud 14 at the time it was detected by the receiver 10, together with the known distance from the light source 12 to the receiver 10, the height of the cloud over the receiver 10 can be calculated.

Prior art rotating beam ceilometers are not considered practical. The apparatus required for a rotating beam ceilometer is bulky and must be firmly implanted on a site which is usually accomplished by anchoring the light source and the receiver in a concrete platform 16.

Many of the disadvantages of the rotating beam ceilometer have been greatly reduced by the advent of the laser rangefinder. Laser rangefinders operate on principles that are very similar to radar. Indeed, laser rangefinders have been termed by the acronym "lidar." The letters "li" of the acronym "lidar" correspond to the word "light." With a "lidar" system, light is bounced off an object whereas with "radar," radio waves are bounced off an object.

Unfortunately, prior to the present invention, there have been no eye-safe laser rangefinders that could be employed as ceilometers with a range beyond 5000 ft. Gallium arsenide laser rangefinders may be used at ranges as great as 5000 feet but, to detect clouds beyond this distance, the required repetition rate and peak power of the laser pulses must be increased beyond eye-safe threshold levels.

On the other hand, ruby laser ceilometers may be used for clouds ranging over distances as great as 35,000 feet. However, at the power levels necessary to provide effective rangefinding over such distances, the power density of a ruby laser beam incident to a human eye at the retina (and collimated by the lens) is beyond the eye safety threshold. One known laser ceilometer is the ruby laser ceilometer shown in FIG. 2 of the drawing. In this device, a pulse of laser light 18 from a ruby laser 20 is aimed at a cloud 22 whereupon it is reflected back to the ceilometer and detected by a detector 26. Prior to striking detector 26, the returning laser light 18 is collected by a lens 28 and filtered by a filter 30. Because these ceilometers generate ruby laser light and are inherently unsafe to the human eye, to reduce the probability of the generated laser light striking an eye, such ceilometers are fired straight up. At this point, it should be noted that firing the laser light straight up into the atmosphere does not make the laser light from a ruby laser eye safe, it merely reduces the probability of the ruby laser light striking an eye since pilots and passengers in planes are not likely to be in a position from which they can look into a beam of light fired straight up from the ground. Since prior art ruby laser ceilometers cannot be safely tilted, they are normally only used to measure the height of clouds that are directly overhead.

It has also been known that the light energy propagated from an erbium doped laser is eye safe at power levels required for effective rangefinding over distances of 40,000 feet. Thus, erbium lasers can be used to make eye safe laser rangefinders. An example of a laser rangefinder which employs an erbium doped laser can be found in U.S. Pat. No. 3,556,657 by F. W. Quelle, Jr., entitled "Laser Rangefinder." As is taught in the Quelle patent, one of the major obstacles to the widespread use of laser rangefinders is the danger to the human eye, and especially the danger to the retina. This danger is the result of the intense radiation generated by lasers. This danger presents such a safety hazard that the use of laser rangefinders at airports, on aircraft carriers and in tactical military field operations has been greatly curtailed.

As is also taught in the Quelle patent, as the relative transmissivity of a laser beam through the ocular medium decreases, the power threshold above which damage to the retina of the eye occurs increases due to the light being attenuated by the ocular medium as it passes toward the retina. With erbium lasers, eye damage due to intense radiation is minimized as a result of the relatively high attenuation of light having a wavelength in the 1.54 micron region (the output for erbium lasers). Because of this ocular attenuation in the 1.54 micron range, a damage threshold of 0.07 j./cm$^2$ focused on the retina is not reached even at close range with erbium doped lasers. The foregoing fact permits the use of 1.54 micron radiation from an erbium laser in applications where intense coherent monochromatic light at other wavelengths causes extensive eye damage. At this point, it should be noted that once damage to the retina occurs, it will not heal naturally. Retinal damage due to irradiation occurs more frequently than other eye damage due to irradiation because the light is focused by the lens of the eye to a small intense point on the retina. While other damage, such as the damage to the cornea, does not occur with an intensity below about 0.5 j./cm$^2$, retinal damage may begin to occur at an intensity of 10$^{-7}$ j./cm$^2$ at the cornea or, correspondingly, 0.7 j./cm$^2$ on the retina. However, in the region between 1.4 and 1.6 microns, no retinal eye damage occurs at radiation levels below 1 joule/cm$^2$. With erbium lasers operated in the 100 millijoule range, no damage is experienced by the human eye even by direct irradiation at close range. This is contrasted to the ruby laser which, at 100 millijoules would cause considerable damage upon direct irradiation of the human eye.

Since erbium lasers emits or lase in the 1.54 micron range, a germanium avalanche detector is normally employed in an erbium laser rangefinder because this detector has a sensitivity to 1.54 micron light. However, until the present invention, a suitable optical system has not been known which would enable a germanium avalanche detector to be used in combination with a Q-switched erbium laser for determining the location of fog, haze and clouds.

SUMMARY OF THE INVENTION

The deficiencies associated with prior art ceilometers are significantly reduced by the laser ceilometer of the present invention which includes a transmitter comprised of a Q-switched erbium doped glass laser, a germanium photodiode which monitors the outgoing pulses and a detector for detecting the returning pulses. To enable the low level of light that is reflected from clouds and fogs to be detected, a germanium avalanche photodiode and amplifier module is positioned at the focus of a parabolic reflector which is able to reflect a sufficient amount of returning light onto the detector to enable cloud height and fog range determinations to be made.

In one important embodiment of the present invention, a periscope system is utilized to line up the axes of the outgoing pulse with the returning light to reduce parallax. In another important embodiment of the present invention, the optical circuit of the ceilometer includes only reflecting surfaces to prevent alignment problems when shifts in wavelengths occur.

To increase the efficiency of the laser generator of the ceilometer, the clamps utilized to position the laser rod within the cavity are formed of the same material as the laser rod and the pump light reflector is a second surface mirror with a quartz substrate coated in succession with silver, copper and black paint. Because the transmitter transmits light in a waveband with an optical center at 1.54 microns, eye safety is not a problem and the ceilometer can be tilted to measure the height of clouds at locations other than overhead.

Accordingly, it is an object of the present invention to provide a new and improved device for enabling fog range determinations, related visibility measurements and cloud height determinations.

It is yet another object of the present invention to provide a new and improved ceilometer.

It is a further object of the present invention to provide a laser ceilometer which can be tilted to determine the height of clouds that are not overhead.

A further object of the present invention is to provide an erbium laser rangefinder with a detection system sensitive enough to detect low amounts of light that are reflected from clouds, fog and the like.

BRIEF DESCRIPTION OF THE DRAWING

FIG. 4 is a partly schematic and partly block diagram of the ceilometer of FIG. 3;

FIG. 5 is a schematic diagram of a laser cavity in accordance with the present invention;

DESCRIPTION OF THE PREFERRED EMBODIMENTS

At the outset, the ceilometer of the present invention is described in its broadest overall aspects with a more detailed description following.

Figure 1:
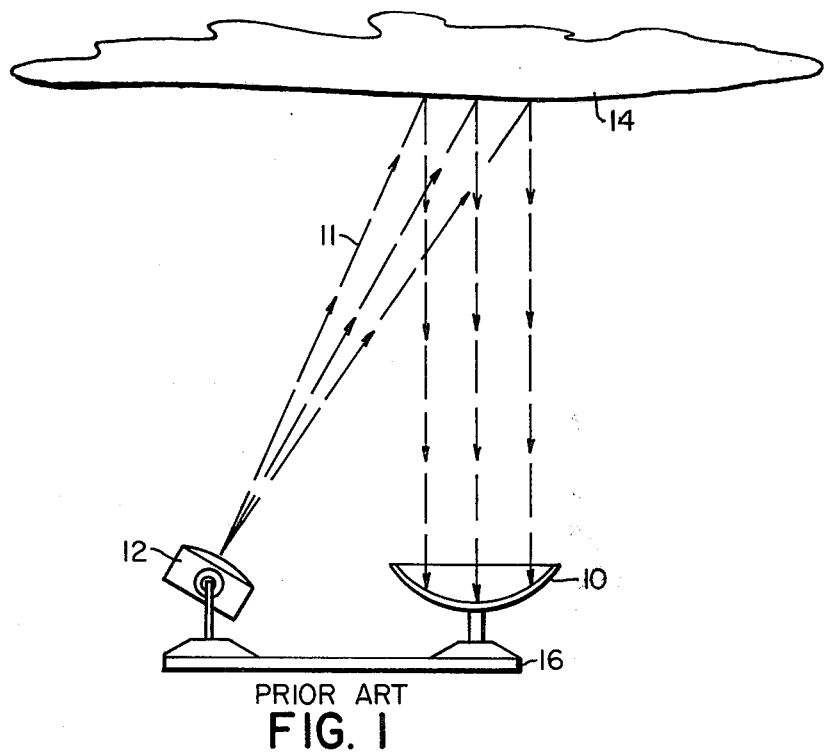
FIG. 1 is a schematic diagram of a prior art rotating beam ceilometer.
Figure 2:
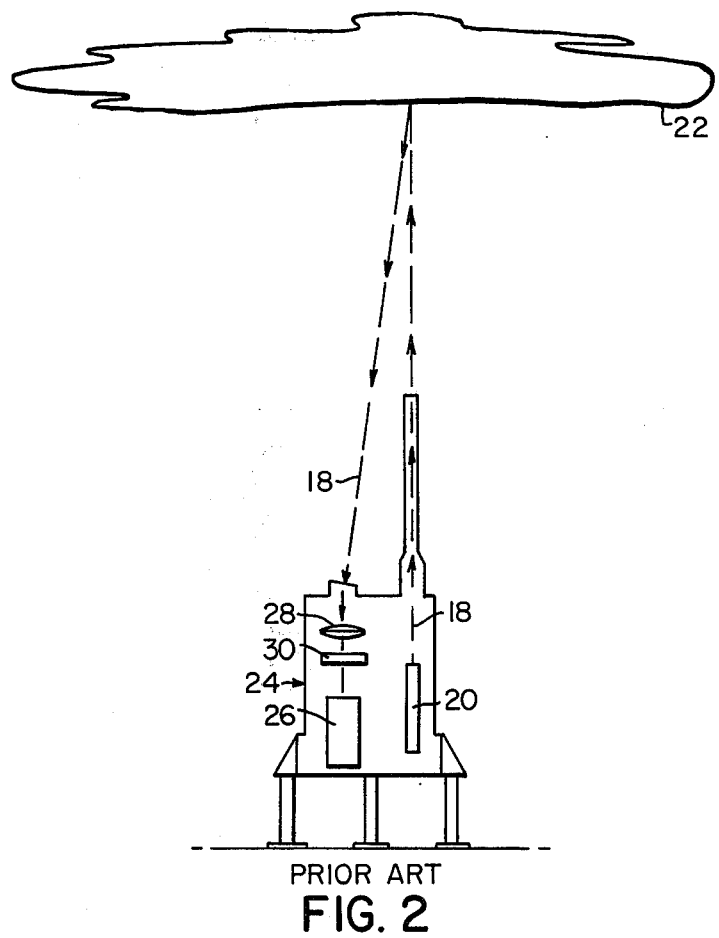
FIG. 2 is a schematic diagram of a prior art ruby laser ceilometer.
Figure 3:
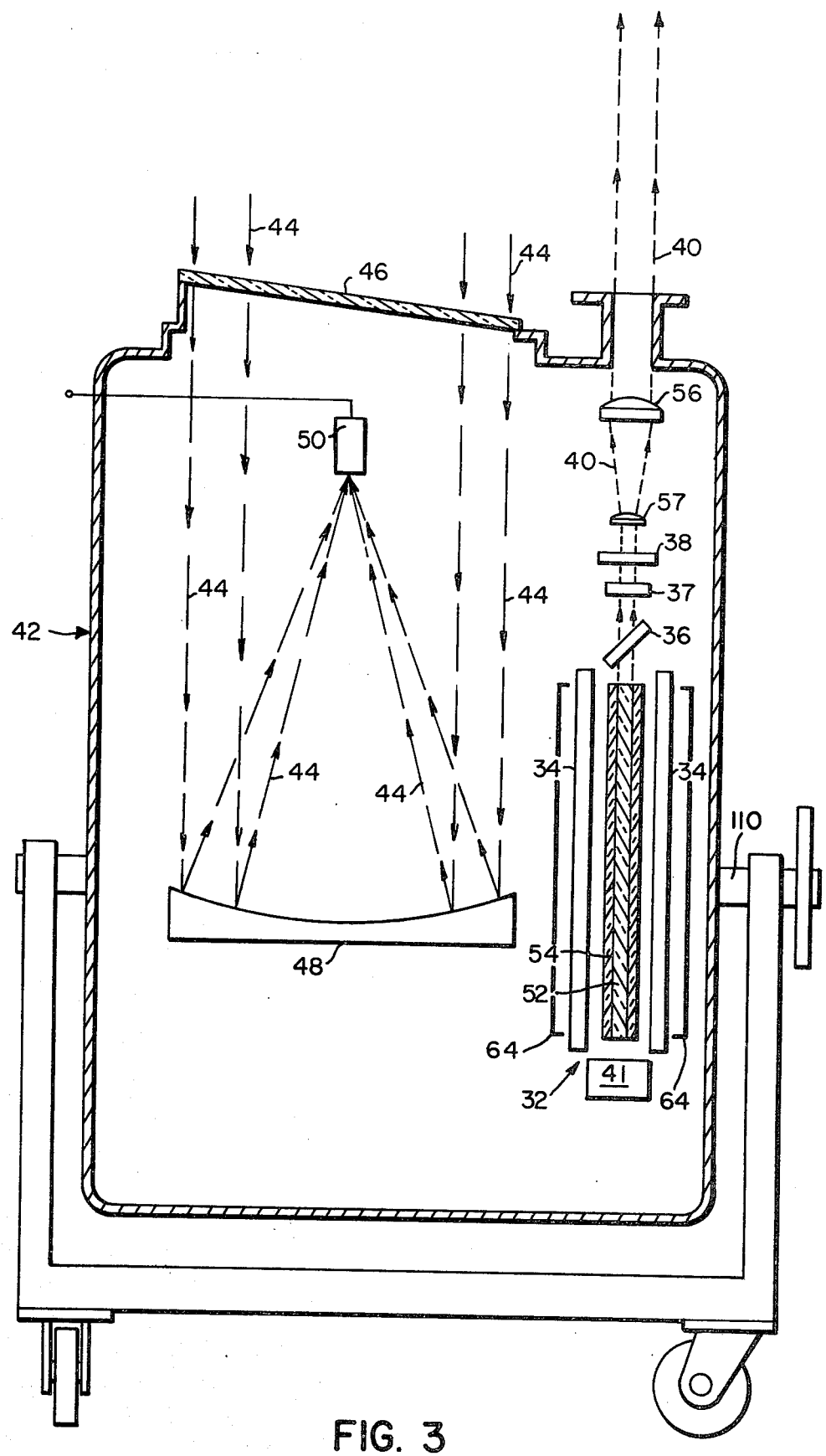
FIG. 3 is a schematic diagram of an erbium laser ceilometer in accordance with the present invention.

One embodiment of the ceilometer of the present invention is shown schematically in FIG. 3 where an erbium Q-switched laser rod 32 is pumped by flashlamps 34. Flashlamps 34 are triggered by a high voltage trigger circuit synchronized with a Q-switching mechanism 36. After a population inversion has been achieved by the above pumping, the erbium rod is made to lase in the pulsed mode by the above Q-switching mechanism 36. The output is selected to be one or more pulses of 30 nanoseconds halfwidth and approximately 1 megawatt peak power of light at 1.54 micrometers. As the pulses are emitted past a germanium photodiode detector 38, that detector 38 monitors the emitted pulse of light represented by arrows 40 and provides a reference pulse signal which is subsequently used as a time reference for comparison with return pulses reflected from cloud formations. The transmitted light pulses 40 then propagate through the atmosphere until it impinges on a target such as a cloud or a fog bank. A portion of the light striking the target is reflected back to the ceilometer 42 as is represented by arrows 44. After passing through a window 46 on the ceilometer, the returning pulses of light are reflected by a parabolic mirror 48 onto a detector system 50. The time interval which elapses between a transmitted pulse as represented by arrows 40 and the signal from detector 38 and the corresponding received pulse as represented by arrows 44 and the signal generated by detector 50 is a measure of the distance to the target. The length of this interval can be determined by the operator from an oscilloscope trace, or can be displayed in digital form as the output of an interval counter. In the latter approach, an output pulse from the detector 38 initiates the counting action of a binary upcounter so that the counter increments its count state in response to appropriately spaced clock pulses. The counting action of the counter is discontinued in response to an output pulse from the return signal detector 50. The duration of time interval between the transmitted and received pulse may readily be converted into a distance by a conventional readout circuit.

Beam divergence of the transmitter and receiver field of view are both approximately 0.5 milliradians (1.8 minutes of arc). As a ceilometer, the unit has a range of over 35,000 feet (day or night capabilities being identical) and detection of multiple cloud layers as well as cloud layers above ground fog, rain or snow is possible.

The erbium laser transmitter is eye safe by virtue of the output wavelength of the emitted light — 1.54 micrometers. Atmospheric transmission is still very good at this wavelength; the water absorption, however, is high enough so that the power density of any laser light incident on the eye is below the eye safety threshold throughout the eye, even at the retina where the incident light would otherwise be focused. At the same time, the water absorption for light at 1.54 microns is not high enough to cause appreciable heating of the front surface of the cornea as would be the case for example for comparable power density light emitted by a carbon dioxide laser. On the basis of tests with monkeys, a corneal lesion (eye safety) threshold of 17 joules/cm$^2$ for a Q-switched laser was measured. Proposed American National Standards Institute standards are 1 joule/cm$^2$ for complete eye safety. These are above the energy density levels at the output of erbium laser rod 32.

In one embodiment of the present invention, the laser rod 32 was 150 mm long and was fabricated from a silicate base glass with a 4 mm diameter core 52 doped with ytterbium and erbium and a cladding 54 having an outside diameter of 6 mm doped with neodymium and ytterbium. The advantages for the foregoing construction of laser rod 32 is set forth in U.S. Pat. No. 3,590,004 to R. F. Woodcock entitled "Laser Material Comprised of Erbium and Ytterbium Doped Glass Core and Neodymium Doped Glass Sensitizer Element," the teachings of which are incorporated herein by reference. The actual composition of the glass of laser rod 32 is set forth in Tables I and II below.

TABLE I

| Composition of Core Glass | |
|---|---|
| Component | Amount in % by weight |
| $SiO_2$ | 59.83 |
| $LiO_2$ | 0.89 |
| $Na_2O$ | 6.42 |
| $K_2O$ | 9.71 |
| $BaO$ | 4.28 |
| $ZnO$ | 1.34 |
| $Al_2O_3$ | 1.34 |
| $Sb_2O_3$ | 0.89 |
| $Er_2O_3$ | 0.30 |
| $Yb_2O_3$ | 15.00 |

TABLE II

| Composition of Cladding Glass | |
|---|---|
| Component | Amount in % by weight |
| $SiO_2$ | 60.7 |
| $LiO_2$ | 0.9 |
| $Na_2O$ | 6.5 |
| $K_2O$ | 9.9 |
| $BaO$ | 4.3 |
| $ZnO$ | 1.4 |
| $Al_2O_3$ | 1.4 |
| $Nd_2O_3$ | 4.0 |
| $Yb_2O_3$ | 4.0 |
| $Y_2O_3$ | 5.0 |
| $CeO$ | 1.9 |

The laser rod 32 pumping circuit comprised two series connected flashlamps 34 connected across a discharge circuit as is best shown in FIG. 4. The flashlamps 34 had a 4 mm inside diameter and a 6 mm outside diameter. The discharge circuit for flashlamps 34 consisted of series connected 540 $\mu$fd capacitance bank 72 (Sprague Model No. 282P2) through a 500 $\mu$hy inductor 74 (EG&G Model No. TR-198) and a series injection transformer 76 (EG&G Model No. TR-185). A high voltage power supply 78 was coupled by way of a full wave rectifier 79 for charging the capacitor bank 72. In operation, synchronizing control 84 directed flashlamps 34 to be initially ionized by a 20,000 volt pulse signal applied by way of the series injection transformer. Then the capacitor bank was discharged to fire the flashlamps 34 which in turn pumped laser rod 32 with a 2 millisecond (half-width) pulse. The relatively long pump pulse gave a good match to the near infrared absorption bands of the glass. Due to the lack of suitable electro-optic modulators at this wavelength, Q-switching was accomplished by a 24,000 rpm rotating sapphire flat 36 driven by motor 82.

A laser cavity in accordance with the present invention is shown schematically in FIG. 5. As is shown in FIG. 5, the front reflector is inclusive of a sapphire flat 36 which rotates at 24,000 rpm. Positioned on the output side of rotating flat 36, in optical alignment with the laser cavity is a quartz flat 37. The rear reflector 41 is formed of two sapphire flats 43 and a quartz flat 45. The two sapphire flats and the quartz flat are aligned with each other and then aligned with the cavity as a unit. The quartz flat 45 is formed of fused quartz onto which a dichroic coating 47 is applied. Coating 47 is 99.9 percent reflective at 1.54 microns. Flats 43, 43, and 45 are maintained in their proper orientation by a stainless steel holder 49 and stainless steel spacers (not shown) which facilitate aligning the flats. The flats are separated from each other by a distance approximately equal to the thickness of the flats.

The peak reflectance of sapphire at 1.54$\mu$ is approximately 30% and the peak reflectance of quartz is approximately 15%. The ends of the laser rod are antireflection coated for 1.54$\mu$ to reduce losses in the cavity.

Figure 10:
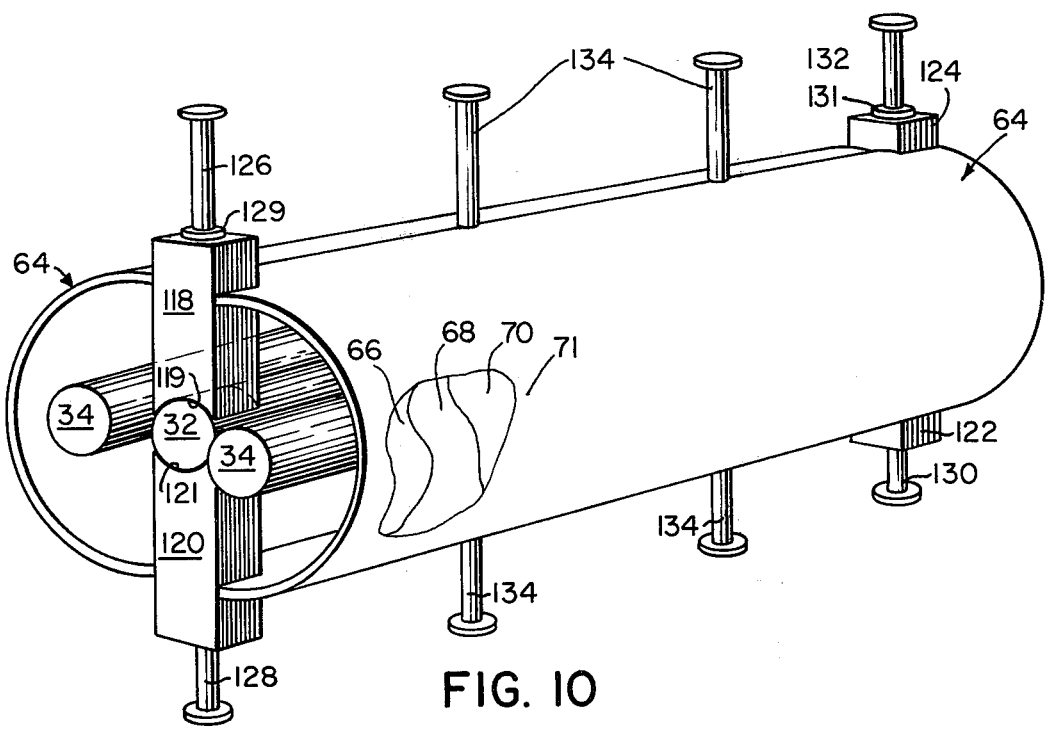
FIG. 10 is a schematic isometric view of a portion of a laser generator according to the invention which is partially cut away to show various features thereof.
Figure 11:
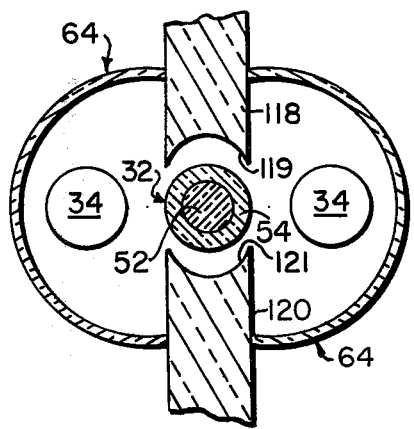
FIG. 11 is an enlarged end view of the holding arrangement shown in FIG. 10.

Further details of the laser cavity for the ceilometer of the present invention are shown in FIGS. 10 and 11. In FIG. 10 erbium laser rod 32, flashlamps 34 and a surrounding imaging cylinder 64 are shown.

The laser rod 32 and the flashlamp 34 are positioned with their respective axes parallel to each other and to the axis of the imaging cylinder 64. Furthermore, the laser rod 32 and flashlamp 34 are positioned within the imaging cylinder 64 in a manner such that the pumping light energy radiated by the flashlamp 34 is imaged by a reflective coating on the interior surfaces of the imaging cylinder 64 onto the laser rod 32. This pumping light energy serves to excite the active erbium laser ions in the laser rod from a ground state to some upper level metastable state from which the radiative transition of the laser ions can occur. This may occur directly, but preferably occurs through a transfer of energy through trivalent ytterbium sensitizer ions within the laser rod.

In the embodiment of the present invention shown in FIG. 10, the laser rod 32 is positioned in the imaging cavity 64 by means of holding members 118, 120, 122, and 124. The holders are divided into two pairs 118 and 120, and 122 and 124, which are identical in arrangement and function. The members 118 and 120 are formed of a glass material which is highly transparent at those wavelengths at which the erbium and/or ytterbium sensitizer ions are absorbant. The holding members may be formed of a clear glass or they may be formed of the glassy material from which the laser rod cladding 54 is formed. Of course, the holding members may also be formed of the same erbium doped glassy material from which the laser rod core 52 is formed. The holding members 118 and 120 are formed from cylindrical bars of the glassy material and have ground, concave end surfaces 119 and 121 respectively which mate precisely with the similarly ground outer surface of the laser rod 32. The surfaces are ground so that sufficient frictional force may be developed between the holding members and the laser rod to provide both lateral and axial stability while assuring that the pumping light energy can pass therethrough with minimal losses. The members 118 and 120 are aligned along a common axis perpendicular to the laser rod axis. Obviously, a greater number of holding members could be utilized at each location along the laser rod as well as the number of locations could be increased, depending on the size of the laser rod and the environment in which the device is to be utilized.

Erbium is a three level laser ion and is absorbant at the laser emission wavelength when in the ground state. When the holders are formed of the same glass material as the laser rod, the pumping light energy from the flashlamp 34 excites the erbium ions in the holders either directly or through sensitizer ions, into the metastable condition in a manner identical to that of the ions in the laser rod per se. The holders then become transparent at the emission and pumping wavelengths of the laser. In this manner, the pumping light energy passes through the holding members into the portions of the laser rod under the holding members so that the ions thereunder are also pumped into an excited state to enable the laser rod to operate at a higher efficiency.

In order that the laser rod is positioned firmly within the imaging cavity 64, means are necessary to urge the holding members against the laser rod. In the embodiment shown in FIG. 10, this function is provided by a series of laser rod holder thumbscrews 126, 128, 130 and 132 associated with holding members 118 through 124 respectively. The outer mounting structure of the laser assembly through which the thumbscrews are threaded is not shown in FIG. 10 for clarity.

When the laser device is operated, certain quantities of heat are absorbed by the laser rod and the holding members. In order to prevent catastrophic failures due to thermal stresses, it is necessary that some resilient means be used to absorb the physical expansion in the glass elements. This is provided in the embodiment of FIG. 10 by pads 129 and 131 which are positioned under thumbscrews 128 and 130 respectively. Similar pads are also associated with thumbscrews 126 and 132. The pads are preferably formed of nylon.

A series of image cylinder adjusting thumbscrews 134 is provided for aligning and positioning the imaging cylinder 64 with respect to the flashlamp 34 and the laser rod 32 such that maximum pumping energy is imaged on the laser rod. The flashlamp 34 is held within the imaging cavity by a pair of flashlamp connector and holder members 136.

The imaging cylinder 64 is a second surface mirror and is formed of a quartz substrate 66 which is coated in succession with a silver coating 68, a copper coating 70, and a coating of black paint 71. The foregoing arrangement not only produces excellent reflections but also serves as a heat sink.

Detector 38 uses a Texas Instruments germanium avalanche photodiode, Model TIXL57 having photosensitivity to light with a wavelength of approximately 1.54 microns. A pulse signal is provided on line 38a coincident with each laser pulse produced by rod 32.

A four power afocal telescope comprised of lens 56, 57 was used to reduce the beam divergence to 0.4 milliradians which matched the receiver field of view.

The receiver system included a 300 mm diameter F2 aluminized parabolic reflector 48. A germanium avalanche photodiode detector module 50 was placed at the focal point of the parabolic reflector 48. The photodiode detector module 50 used was a Texas Instrument Model No. TIXL76. This germanium avalanche photodiode detector module is optimized for 1.54 micron light detection and has maximum noise effective power (NEP) of approximately $6 \times 10^{-12}$ W $\sqrt{Hz}$ with a 50 MHz bandwidth and a minimum responsivity of 6 V/mW.

Spectral filtering was provided by an outside window 46 of infrared transmitting glass having no transmission below 1.2 microns and the 1.6 micron long wavelength cutoff of the detector 50. Within this wavelength interval, the sky back ground was estimated to be $7 \times 10^{-9}$W for brightly backlit clouds. This is lower than the internal receiver noise of the module. In fact, with a 100A spectral filter width, the receiver aperture could be increased to 2 meters before the worst case of sky background would be equal to the internal receiver noise.

The composition of the infrared transmitting filter glass used in fabricating window 46 is set forth in Table III below.

TABLE III

| Composition of Window Glass | |
|---|---|
| Component | Amount in % by Weight |
| $SiO_2$ | 51.90 |
| $Na_2O$ | 6.50 |
| $K_2O$ | 6.80 |
| $CaO$ | 6.50 |
| $Al_2O_3$ | 1.40 |
| $ZnO$ | 2.20 |
| $TiO_2$ | .40 |
| $Sb_2O_3$ | .40 |
| $MgO$ | 23.40 |
| $Cr_2O_3$ | .50 |

As is shown in FIG. 4, an output station 86 has a first input from detector 38 applied by line 38a and a second input from the detector module 50 applied by line 39. Station 86 provides the operator with the rangefinding system output data. In one embodiment, an oscilloscope 85 may be triggered by each pulse signal applied by line 38a to display the corresponding reflected pulse detected by detector module 50 (as applied by line 39). The operator may then determine the time difference between the associated pulses from lines 38a and 39 and compute the corresponding distance of the target. Alternatively, station 86 may include an analog-to-digital storage means 88 such as the model number 610B Transient Recorder manufactured by Biomation Corporation. The storage means 88 may be activated by the reference pulse from detector 38 (applied by line 38a) to process the analog signal applied from detector module 50 (by line 39) so that a digital version of the return signal is stored at means 88. The operator may subsequently direct a chart recording means 90 to selectively mint out the stored version of particular detected return signal.

A ceilometer in accordance with the present invention was set on a flat roof of a three story building and ranged on clouds and the surrounding countryside. The device used in this test was similar to the one shown in FIG. 3 except that it did not include a laser collimating telescope, and the detector was not operated in the avalanche mode. The data obtained from this test is shown in FIG. 6.

Figure 6:
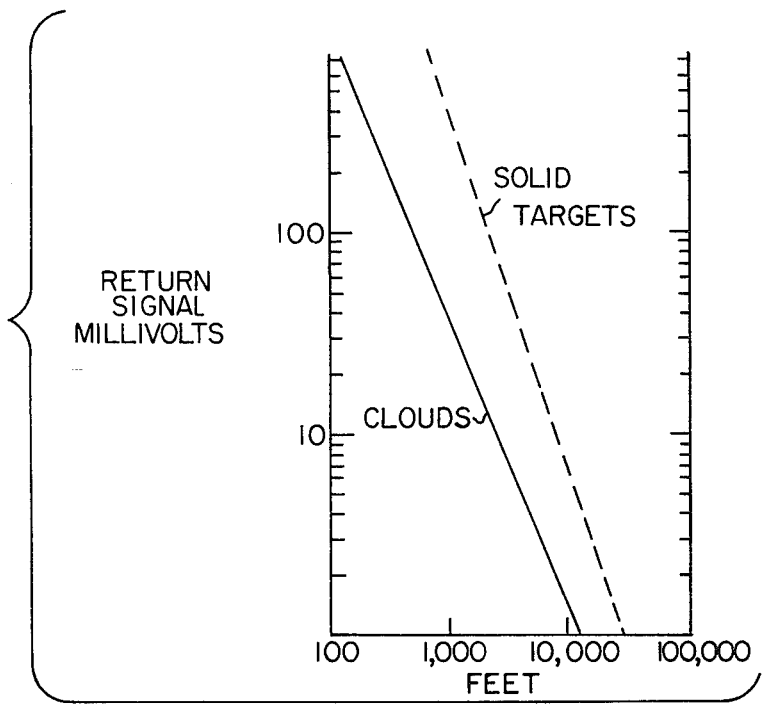
FIG. 6 is a graph showing data obtained during ranging tests with the ceilometer of the present invention.

As is shown in FIG. 6, the near in target data is decreased by the effects of parallax since the laser and receiver axes were 225 nm apart. Nevertheless, it can be seen that is a consistent order of magnitude difference between the solid and the cloud return peak power levels. The average pulse distortion for a cloud return was stretched to 345 nanoseconds. For thick clouds, the pulse is stretched out by an order of magnitude. Occasionally, short pulses were seen as a result of clouds of only a few feet in thickness.

Figure 7:
FIG. 7 is an oscilloscope trace of fog as determined by the ceilometer of the present invention.
Figure 8:
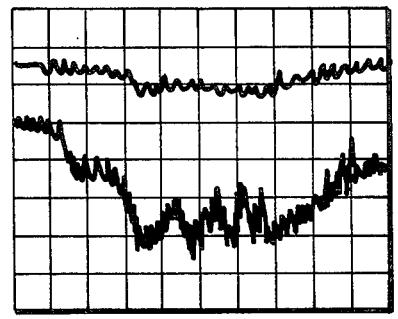
FIG. 8 is an oscilloscope trace of snow as determined by the ceilometer of the present invention.
Figure 9:
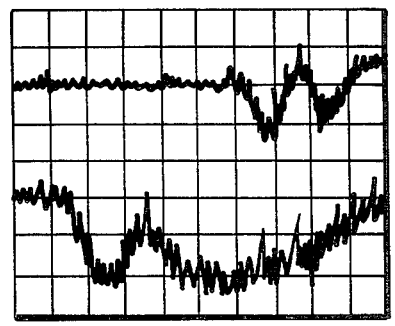
FIG. 9 is an oscilloscope trace of rain as determined by the ceilometer of the present invention

As is shown in FIGS. 7, 8 and 9, rain, snow and fog could easily be distinguished. A homogeneous fog will show a characteristic return trace whose leading edge is primarily a function of the optical geometry, i.e., near-in incomplete overlap between receiver field of view and transmitter beam while the trailing edge reflects the atmospheric attenuation and backscatter characteristics. In the case of rain, a trace similar to that for homogeneous fog appears but the additional structure due to the discrete raindrop returns clearly identifies it. Snowflakes are less closely spaced than raindrops and, when properly oriented, have a very high individual reflectance. This can be seen from the amplitude of the structure.

To further test the ceilometer of the present invention, it was compared with a ruby laser ceilometer and a standard rotating beam ceilometer. The latter consisted of a tungsten filament projection system modulated at 120 Hz. The projected beam was continuously rotated from the vertical to the horizontal. A receiver was set a fixed distance away, (usually 400 ft.), with its field of view vertical and coplanar with the rotating transmitter beam. The volume of intersection moved up as the beam rotated to the vertical; if it coincided with a cloud base, the backscatter was observed. The angle at which this occurs yields cloud height by triangulation. The accuracy of this instrument is 1° resulting in a varying linear accuracy with cloud height. At higher altitudes both the accuracy and the ability to resolve multiple cloud layers suffers. As a result, the instrument is generally used for reading cloud base heights only up to 3,000 ft.

The two laser ceilometers were set within 1 meter of each other and the rotating beam ceilometer receiver was 100 feet away. Data was taken with a time delay of no more than 3 seconds for reading all three instruments. Output for both laser ceilometers were about 1 megawatt peak power with pulse halfwidths of about 35 nanoseconds.

Comparative data for a series of measurements showed very good correlation between the two laser ceilometers. However, in spite of the near simultaneous firing and location, there were differences which were attributed to the fact that the lasers were not monitoring identical cloud volumes. The laser ceilometers were in agreement with the rotating beam ceilometer over its useful range and performed as ceilometers at cloud altitudes as high as are likely to be encountered.

These tests proved that a relatively low power, eye safe erbium laser rangefinder can be used as a ceilometer and also yield information about the existing weather conditions, including visibility. Because it is a single ended device, it has the further advantages that it can be pointed in any direction and it does not require an elaborate installation.

Figure 12:
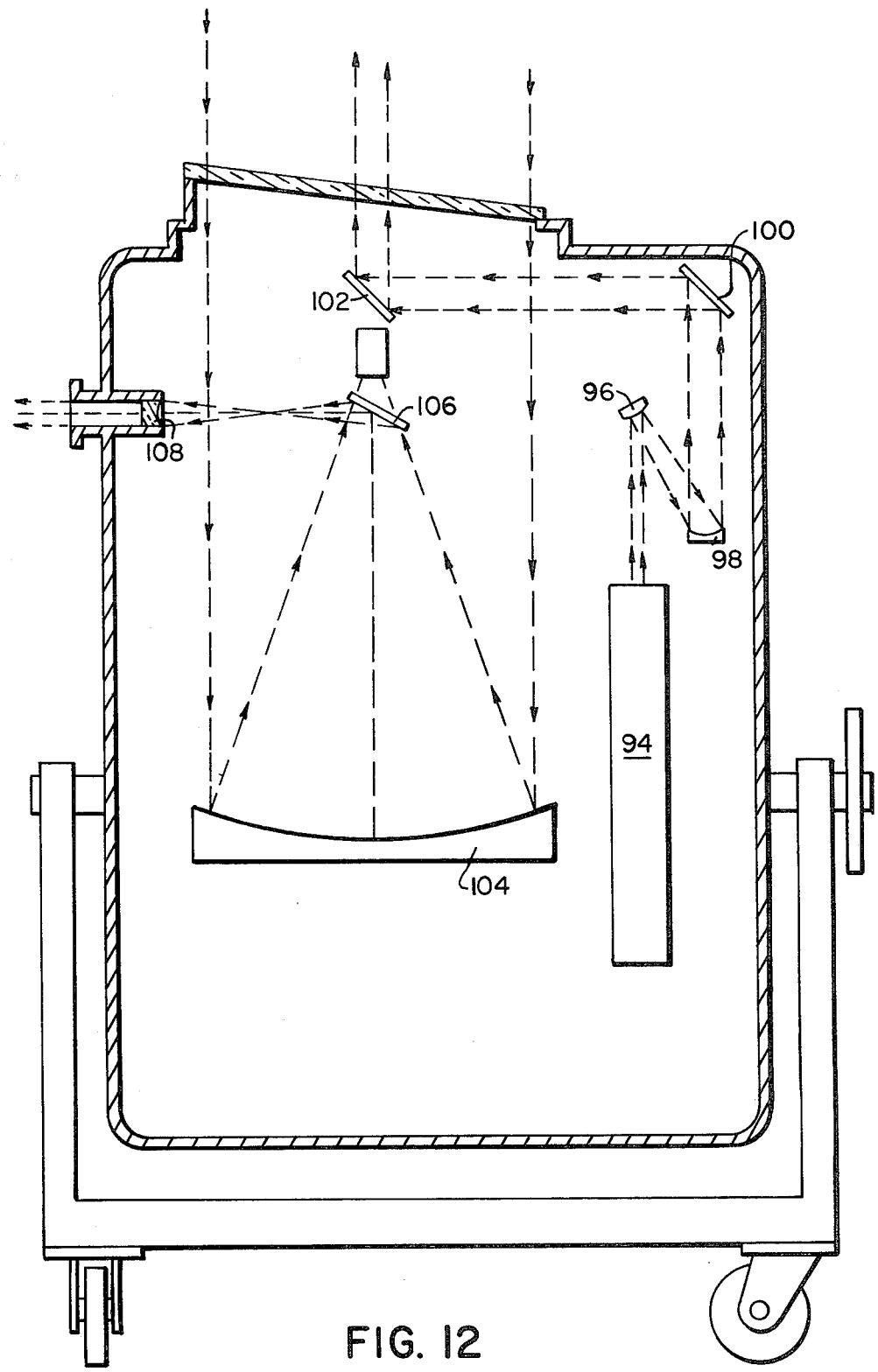
FIG. 12 is a schematic diagram of an alternate embodiment of the present invention.

FIG. 12 is a schematic diagram of an alternate embodiment of the present invention. The significant advantages of the embodiment of the invention shown in FIG. 12 is that it contains only reflecting surfaces as distinguished from the embodiment containing refracting surfaces. It has been found that refracting surfaces can cause problems when shifts in wavelengths occur.

Another advantage of the embodiment of the invention shown in FIG. 12, is that it contains a periscope arrangement which lines up the outgoing pulse with the incoming signal. Such an arrangement reduces parallax problems.

In FIG. 12 a laser generator 94 is shown schematically. It should be noted, however, that laser generator 94 is similar to the laser generator shown in greater detail in FIG. 5. Instead of the lenses 56–57 shown in the embodiment of FIG. 3, the embodiment of FIG. 12 includes a beam expanding telescope formed from reflecting components 96 and 98. The beam expanding telescope is designed to yield beam expansion equivalent to a four power afocal telescope.

Reflecting surfaces 100 and 102 form a periscope which lines up the outgoing laser pulse with the axis of the received signal. This arrangement entirely eliminates parallax problems. Located along the axis of parabolic reflector 104 is a beam splitter 106. A viewing scope 108 enables an observer to sight the target along the receiver axis. Beam splitter 106, of course, is aligned with the parabolic reflector 104, so that an image of a target impinging upon the parabolic reflector is reflected through the viewing scope 108 to an observer. The foregoing arrangement not only enables an observer to accurately sight a target to be measured, it is also achromatic, that is, completely corrected at more than one wavelength.

By following the teachings of the present invention, a ceilometer, that is eye safe results. Furthermore, the optics of the ceilometer of the present invention enable accurate determinations of fog, rain and the like. Because the ceilometer of the present invention is eye safe, it can be safely tilted. Thus, as shown in FIG. 3, the ceilometer can be pivoted about a support member 110.

The present embodiments are to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:

1. A laser rangefinder comprising a laser generator for generating laser light at 1.54 microns comprising an erbium doped laser rod and means for pumping said laser rod, said laser rod being positioned in optical alignment in an optically regenerative laser cavity, said cavity being formed by forward and rearward reflectors, the forward reflector comprising a rotating saphire flat, and the rearward reflector comprising saphire flats and a quartz flat; a monitor for monitoring the outgoing laser pulse emitted by said generator; a detector for detecting light generated by said laser and reflected back to said rangefinder; a parabolic reflector for focusing light onto said detector; said detector being positioned at the focal point of said reflector; an infrared transmitting window in the optical path of laser light reaching said detector, said window allowing no transmission of light in wavebands below 1.2 microns or above 1.6 microns; and means for aligning the outgoing laser pulse along the optical axis of said parabolic reflector to align the outgoing pulse with the detector and thereby reduce parralax, and wherein said window is formed of glass having the following composition:

| Component | Amount in % by Weight |
|---|---|
| SiO$_2$ | 51.90 |
| Na$_2$O | 6.50 |
| K$_2$O | 6.80 |
| CaO | 6.50 |
| Al$_2$O$_3$ | 1.40 |
| ZnO | 2.20 |
| TiO$_2$ | .40 |
| Sb$_2$O$_3$ | .40 |
| MgO | 23.40 |
| Cr$_2$O$_3$ | .50. |

2. The laser rangefinder as set forth in claim 1 wherein said rearward reflector includes two sapphire flats and a fused quartz flat, said fused quartz flat having a dichroic coating which is reflective at 1.54 microns.

3. The laser rangefinder as set forth in claim 2 wherein the forward reflector includes a quartz flat on the output side of said rotating sapphire flat.

4. The laser rangefinder as set forth in claim 1 wherein the sapphire flats and quartz flat which comprise said rearward reflector are separated from each other by a distance approximately equal to the thickness of the flats.

5. The laser rangefinder as set forth in claim 2 wherein said dichroic coating is approximately 99.9 percent reflective at 1.54 microns.

6. A laser rangefinder comprising an erbium doped laser transmitter; a monitor for monitoring the outgoing laser pulse emitted by said transmitter, a detector for detecting light generated by said laser and reflected back to said rangefinder; a parabolic reflector for focusing light onto said detector, said detector being positioned at the focal point of said reflector; and an infrared transmitting window in the optical path of laser light reaching said detector, said window allowing no transmission of light in wavebands below 1.2 microns or above 1.6 microns wherein said window is formed of glass having the following composition:

| Component | Amount in % by Weight |
|---|---|
| SiO$_2$ | 51.90 |
| Na$_2$O | 6.50 |
| K$_2$O | 6.80 |
| CaO | 6.50 |
| Al$_2$O$_3$ | 1.40 |
| ZnO | 2.20 |
| TiO$_2$ | .40 |
| Sb$_2$O$_3$ | .40 |
| MgO | 23.40 |
| Cr$_2$O$_3$ | .50. |

7. An eye safe laser ceilometer for making cloud height determinations comprising a laser transmitter which includes a Q-switched erbium doped glass laser for generating laser light in a waveband centered at 1.54 microns, a germanium photodiode monitor for monitoring an outgoing pulse emitted by said laser transmitter, a parabolic reflector for reflecting light received by the ceilometer onto a detector, a detector positioned at the focus point of said parabolic reflector and an infrared transmitting window in the optical path of said detector, said detector being formed of glass and having the following composition:

| Component | Amount in % by Weight |
|---|---|
| SiO$_2$ | 51.90 |
| Na$_2$O | 6.50 |
| K$_2$O | 6.80 |
| CaO | 6.50 |
| Al$_2$O$_3$ | 1.40 |
| ZnO | 2.20 |
| TiO$_2$ | .40 |
| Sb$_2$O$_3$ | .40 |
| MgO | 23.40 |
| Cr$_2$O$_3$ | .50. |

8. The laser ceilometer as set forth in claim 7 wherein said detector is a germanium avalanche photodiode.

* * * * *